(12) United States Patent
Fuchs et al.

(10) Patent No.: US 9,299,501 B2
(45) Date of Patent: Mar. 29, 2016

(54) ALKALINE SINGLE ION CONDUCTORS WITH HIGH CONDUCTIVITY AND TRANSFERENCE NUMBER AND METHODS FOR PREPARING THE SAME

(75) Inventors: Annette Fuchs, Weil der Stadt (DE); Klaus-Dieter Kreuer, Boeblingen (DE); Joachim Maier, Wiernsheim (DE); Andreas Wohlfarth, Pfullendorf (DE)

(73) Assignee: Max-Planck-Gesellschaft zur Foerderung der Wissenschaften e.V. (DE)

( * ) Notice: Subject to any disclaimer, the term of this patent is extended or adjusted under 35 U.S.C. 154(b) by 265 days.

(21) Appl. No.: 13/882,535
(22) PCT Filed: Nov. 2, 2011
(86) PCT No.: PCT/EP2011/005526
§ 371 (c)(1), (2), (4) Date: May 8, 2013
(87) PCT Pub. No.: WO2012/059222
PCT Pub. Date: May 10, 2012

(65) Prior Publication Data
US 2013/0216936 A1 Aug. 22, 2013

(30) Foreign Application Priority Data
Nov. 5, 2010 (EP) .................... 10014342

(51) Int. Cl.
H01M 8/10 (2006.01)
H01G 9/035 (2006.01)
(Continued)

(52) U.S. Cl.
CPC .............. *H01G 9/035* (2013.01); *H01B 1/122* (2013.01); *H01M 8/1018* (2013.01); *H01M 10/0565* (2013.01); *H01M 10/0568* (2013.01); *H01M 10/0569* (2013.01); *H01M 2300/0082* (2013.01)

(58) Field of Classification Search
None
See application file for complete search history.

(56) References Cited

U.S. PATENT DOCUMENTS 6,033,804 A 3/2000 Doyle et al.
6,117,590 A 9/2000 Skotheim et al.
(Continued)

FOREIGN PATENT DOCUMENTS

WO 98/20573 5/1998
WO 2006/094767 9/2006

OTHER PUBLICATIONS

Florjanczyk et al., Highly conducting lithium polyelectrolytes based on maleic anhydride-styrene copolymers, J.Phys.Chem. B 1998, 102, 8409-8416.*

(Continued)

*Primary Examiner* — Patrick Ryan
*Assistant Examiner* — Jose Colucci Rios
(74) *Attorney, Agent, or Firm* — DLA Piper LLP (US)

(57) ABSTRACT

A method of producing an alkaline single ion conductor with high conductivity includes: a) providing a hydrocarbon oligomer or polymer having immobilized acidic substituent groups selected from the group consisting of a sulfonic acid group, sulfamide group, a phosphonic acid group, or a carboxy group, in its alkaline ion form wherein at least a part of the acidic protons of the substituent groups have been exchanged against alkali cations, and b) solvating the hydrocarbon oligomer or polymer of step a) in an aprotic polar solvent for a sufficient time to effect a solvent uptake of at least 5% by weight and to obtain a solvated product, wherein the molar ratio of solvent/alkaline cation is 1:1 to 10,000:1, and which solvated product has a conductivity of at least $10^{-5}$ S/cm at room temperature (24° C.).

14 Claims, 5 Drawing Sheets

(51) Int. Cl.
  *H01B 1/12*     (2006.01)
  *H01M 10/0565*  (2010.01)
  *H01M 10/0568*  (2010.01)
  *H01M 10/0569*  (2010.01)

(56) References Cited

U.S. PATENT DOCUMENTS

2005/0118478 A1* 6/2005 Kiefer et al. .................... 429/33
2007/0082247 A1* 4/2007 Lee et al. ........................ 429/33
2007/0205388 A1* 9/2007 Armand et al. ............. 252/62.2

OTHER PUBLICATIONS

Kreuer, K.D., "Hydrocarbon Membranes," *Handbook of Fuel Cells—Fundamental Technology and Applications*, 2003, vol. 3, part 3, pp. 420-435.

Rikukawa, M. et al., "Proton-Conducting Polymer Electrolyte Membranes Based on Hydrocarbon Polymers," *Progress in Polymer Science*, 2000, vol. 25, pp. 1463-1502.

Hickner, M.A. et al., "Alternative Polymer Systems for Proton Exchange Membranes (PEMs)," *Chemical Reviews*, 2004, vol. 104, No. 10, pp. 4587-4611.

Schuster, M. et al., "Highly Sulfonated Poly(phenylene sulfone): Preparation and Stability Issues," *Macromolecules*, 2009, vol. 42, pp. 3129-3137.

Schuster, M. et al., "Sulfonated Poly(phenylene sulfone) Polymers as Hydrolytically and Thermooxidatively Stable Proton Conducting Ionomers," *Macromolecules*, 2007, vol. 40, pp. 598-607.

Lafitte, B. et al., "On the Prospects for Phosphonated Polymers as Proton-Exchange Fuel Cell Membranes," *Advances in Fuel Cells*, 2007, vol. 1, Chapter 3, pp. 119-185.

Bingöl, B. et al., "Synthesis, Microstructure, and Acidity of Poly(vinylphosphonic Acid)," *Macromolecular Rapid Communications*, 2006, vol. 6, pp. 1719-1724.

Xu, K., "Nonaqueous Liquid Electrolytes for Lithium-Based Rechargeable Batteries," *Chemical Reviews*, 2004, vol. 104, No. 10, pp. 4303-4417.

Florjańczyk, Z. et al., "Highly Conducting Lithium Polyelectrolytes Based on Maleic Anhydride-Styrene Coploymers," *J. Phys. Chem. B*, 1998, vol. 102, No. 43, pp. 8409-8416.

Michel Armand, Jean-Pierre Bonnet, Rachid Meziane, 12th International Symposium on Polymer Electrolytes, Padova, Aug. 29-Sep. 3, 2010, the contents of which are reflected in Meziane, R. et al., "Single-Ion Polymer Electrolytes Based on a Delocalized Polyanion for Lithium Batteries," *Electrochimica Acta*, 2011, vol. 57, pp. 14-19.

* cited by examiner

ALKALINE SINGLE ION CONDUCTORS WITH HIGH CONDUCTIVITY AND TRANSFERENCE NUMBER AND METHODS FOR PREPARING THE SAME

TECHNICAL FIELD

This disclosure relates to alkaline single ion conductors with high conductivity and transference numbers along with methods of preparing the conductors.

BACKGROUND

The vast majority of alkaline ion conductors used in electrochemical cells, especially batteries, are solutions of salts (such as $LiCF_3SO_3$ or $LiPF_6$) in either aprotic polar solvents (such as ethylene carbonate) or polar polymers (such as polyethylene oxides). In these environments, dissociation is not complete, i.e., a number of different charged species are present. The effective transference number of $Li^+$ is usually around 30%, and the presence of different kinds of mobile species (e.g., anions, triple ions) leads to significant concentration polarization effects (formation of a salt concentration gradient) at high $Li^+$ currents. Especially for high drain applications such as batteries, a true single ion (in particular $Li^+$) conductor is very desirable since it would allow for higher currents.

Relatively high ionic conductivities were reported for solvated PFSA (perfluorosulfonic acid) ionomers (e.g., Nafion). For the latter, the highest conductivities observed were of the order of $10^{-3}$ S/cm at room temperature (U.S. Pat. No. 6,033,804).

PFSA ionomers have been chosen because they were known to show the highest conductivities among all ionomers in their hydrated proton forms. This was thought to be the result of their special microstructure which is distinctly different from this of hydrocarbon based ionomers. This microstructure is thought to be beneficial in obtaining high ionic conductivity, but it is also the reason for the very high hydrodynamic solvent transport (solvent permeation and electroosmotic solvent drag) in such systems. Therefore, non-perfluorinated hydrocarbon ionomers and polyelectrolytes in aprotic media had never been considered as base material in obtaining high alkaline ion conductivity.

Thus, there is a need to provide improved hydrocarbon polymer-based alkaline single ion conductors with very high conductivity and transference number and low hydrodynamic solvent transport in aprotic media and methods for preparing the same.

SUMMARY

We provide a method of producing an alkaline single ion conductor with high conductivity including a) providing a hydrocarbon oligomer or polymer having immobilized acidic substituent groups selected from the group consisting of a sulfonic acid group, sulfamide group, a phosphonic acid group, or a carboxy group, in its alkaline ion form wherein at least a part of the acidic protons of the substituent groups have been exchanged against alkali cations, and b) solvating the hydrocarbon oligomer or polymer of step a) in an aprotic polar solvent for a sufficient time to effect a solvent uptake of at least 5% by weight and to obtain a solvated product, wherein the molar ratio of solvent/alkaline cation is 1:1 to 10,000:1, and which solvated product has a conductivity of at least $10^{-5}$ S/cm at room temperature (24° C.).

We also provide an alkaline single ion conductor produced by the method of producing an alkaline single ion conductor with high conductivity including a) providing a hydrocarbon oligomer or polymer having immobilized acidic substituent groups selected from the group consisting of a sulfonic acid group, sulfamide group, a phosphonic acid group, or a carboxy group, in its alkaline ion form wherein at least a part of the acidic protons of the substituent groups have been exchanged against alkali cations, and b) solvating the hydrocarbon oligomer or polymer of step a) in an aprotic polar solvent for a sufficient time to effect a solvent uptake of at least 5% by weight and to obtain a solvated product, wherein the molar ratio of solvent/alkaline cation is 1:1 to 10,000:1, and which solvated product has a conductivity of at least $10^{-5}$ S/cm at room temperature (24° C.) and including a hydrocarbon oligomer or polymer having immobilized acidic substituent groups selected from the group consisting of a sulfonic acid group, sulfamide group, a phosphonic acid group, or a carboxy group, in its alkaline ion form, wherein the hydrocarbon oligomer or polymer is solvated in an aprotic polar solvent and has a molar ration of solvent/alkali cation of 1:1 to 10,000:1, and a conductivity of at least $10^{-5}$ S/cm at room temperature (24° C.) in the aprotic solvent.

We further provide an electric or electrochemical storage device including the alkaline single ion conductor produced by the method of producing an alkaline single ion conductor with high conductivity including a) providing a hydrocarbon oligomer or polymer having immobilized acidic substituent groups selected from the group consisting of a sulfonic acid group, sulfamide group, a phosphonic acid group, or a carboxy group, in its alkaline ion form wherein at least a part of the acidic protons of the substituent groups have been exchanged against alkali cations, and b) solvating the hydrocarbon oligomer or polymer of step a) in an aprotic polar solvent for a sufficient time to effect a solvent uptake of at least 5% by weight and to obtain a solvated product, wherein the molar ratio of solvent/alkaline cation is 1:1 to 10,000:1, and which solvated product has a conductivity of at least $10^{-5}$ S/cm at room temperature (24° C.) and including a hydrocarbon oligomer or polymer having immobilized acidic substituent groups selected from the group consisting of a sulfonic acid group, sulfamide group, a phosphonic acid group, or a carboxy group, in its alkaline ion form, wherein the hydrocarbon oligomer or polymer is solvated in an aprotic polar solvent and has a molar ration of solvent/alkali cation of 1:1 to 10,000:1, and a conductivity of at least $10^{-5}$ S/cm at room temperature (24° C.) in the aprotic solvent.

DETAILED DESCRIPTION

Figure 1:
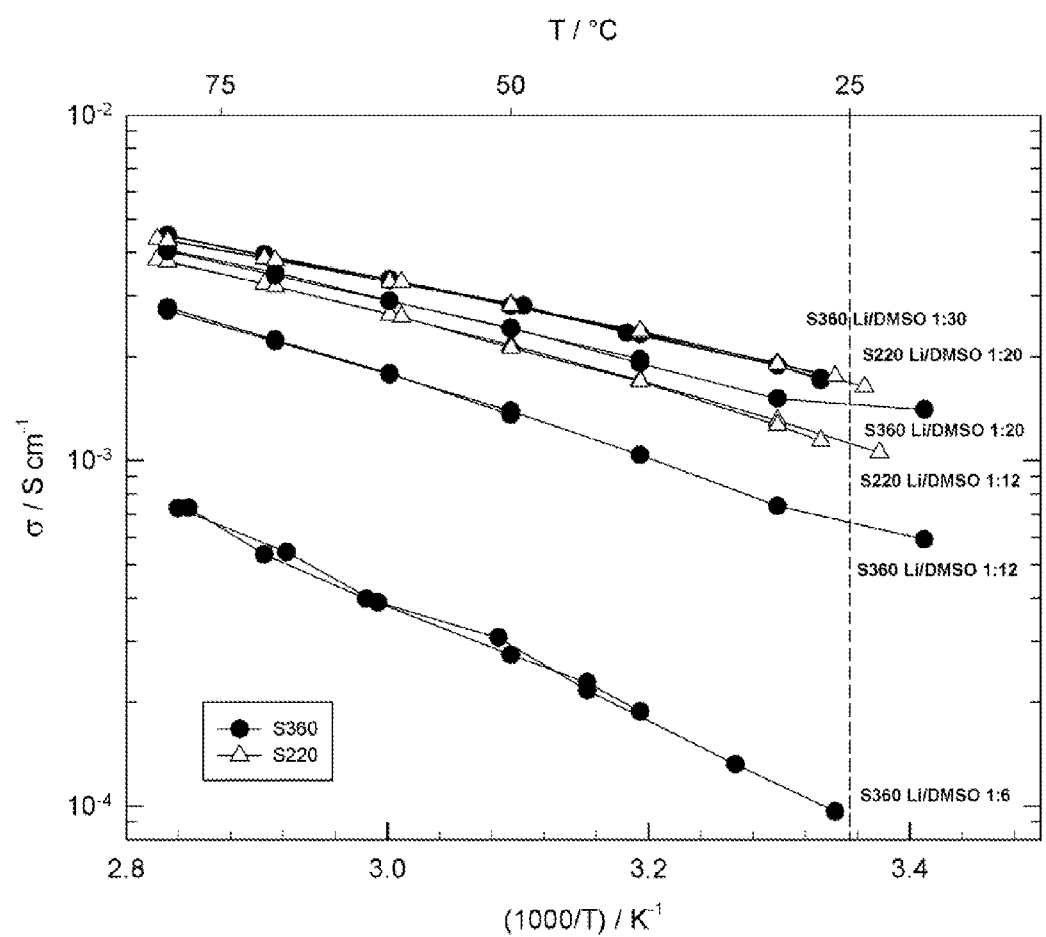
FIG. 1 shows $Li^+$-conductivity of a fully (red: S-220) and semi sulfonated poly(phenylene-sulfone) (black: S-360) as a function of T and solvent (DMSO) concentration (in mol DMSO/mol $Li^+$).

We provide pure alkaline ion conductors (transference number equal or close to unity) with alkaline conductivities similar to those of solutions of alkaline ion salts. For this, ionomers or polyelectrolytes, preferably of high ion exchange capacity, especially highly sulfonated polyarylene sulfones, are transferred into their alkaline ion form and then solvated with aprotic polar solvents. Surprisingly, such materials show much higher maximal ionic conductivities than those reported for solvated PFSA (perfluorosulfonic acid) ionomers (e.g., Nafion) treated in the same way.

Our methods of producing an alkaline single ion conductor with high conductivity comprise:
a) providing a hydrocarbon oligomer or polymer having immobilized acidic substituent groups selected from the group consisting of a sulfonic acid group, sulfamide group, a phosphonic acid group, or a carboxy group, in its alkaline ion form wherein at least a part of the acidic protons of the substituent groups have been exchanged against alkali cations, and
b) solvating the hydrocarbon oligomer or polymer of step a) in an aprotic polar solvent for a sufficient time to effect a solvent uptake of at least 5% by weight and to obtain a solvated product wherein the molar ratio of solvent/alkaline cation is 1:1 to 10,000:1, more specifically 1:1 to 1,000:1, preferably 3:1 to 200:1, and which solvated product has a conductivity of at least $10^{-5}$ S/cm at room temperature (24° C.).

The hydrocarbon oligomer or polymer may be any hydrocarbon-based, non-perfluorinated oligomer or polymer which can be substituted with the desired amount of immobilized acidic substituent groups as indicated above. The oligomer or polymer may comprise aliphatic or aromatic recurring units or combinations thereof. The oligomer or polymer may be, e.g., selected from the group comprising polyethers, polyesters, polyimides and polyamides, polybenzimidazoles, polysulfones, polyether sulfones, polyether ketones, polyphenylene oxides, polyphenylene sulfide, polycarbonates, vinyl-based polymers, acryl-based polymers, e.g., polymethyl methacrylates, and polyphosphazenes.

Specifically, the hydrocarbon oligomer or polymer is a polyvinylphosphonic acid in its alkali ion form or a polyarylene compound comprising one or more structural elements of Formula I:

$$—[—X—Ar(WA)_n\text{-}Y—]_m— \quad (I)$$

wherein m is an integer of 1 to 1,000,000, more specifically 1 to 100,000, preferably 1 to 10,000, e.g., 1 to 1,000 or 1 to 100, X and Y, which are identical or different from each other, each represent a bridging group which may be an electron-acceptor or electron-donor group or neither, and Ar represents an aromatic or heteroaromatic ring system with 5-18 ring atoms and with W representing an anion of an acidic substituent group selected from a sulfonic acid group, sulfamide group, a phosphonic acid group, or a carboxy group, A representing an alkali cation, and n being 0.1 to 4; wherein the aromatic or heteroaromatic ring system, in addition to the acidic group W and the substituents X and Y, may feature additional substituents, preferably substituents which are not electron-donor groups; and wherein X, Y, Ar, W, n and m can be identical or different in different structural elements, independently of each other.

More specifically, the polyarylene compound consists of recurring elements of Formula I.

Preferably, the alkali counterion of the hydrocarbon oligomer or polymer is selected from the group consisting of a Na⁺ cation and a Li⁺ cation.

The hydrocarbon oligomer or polymer, in particular the polyarylene compound or polyvinylphosphonic acid, may be unsubstituted, except for the acidic substituents, or further substituted/grafted by aliphatic and/or aromatic substituents.

In a specific example, Ar in the sulfonated polyarylene of Formula I above is selected from the group consisting of phenylene, naphthylene, anthracene, phenanthrene, biphenylene, furan, thiophene, pyrrole, thiazole, triazole, pyridine, imidazole and benzimidazole. Preferably, Ar is phenylene.

In a further specific example, X and Y in Formula I are selected independently of each other from the group consisting of —SO₂—, —SO—, —SO₂O—, —CO—, —COO—, —CONH—, —CONR— or —POR—, with R being an organic residue, in particular alkyl, preferably lower alkyl with $C_1$-$C_{10}$, —S—, —O—, and —SO₂—NH—SO₂—, unsubstituted or substituted alkylene, e.g., fluorinated alkylene, unsubstituted or substituted arylene. Specifically, the unsubstituted or substituted arylene group may comprise a phenylene, naphthylene, anthracene, phenanthrene, biphenylene, furan, thiophene, pyrrole, thiazole, triazole, pyridine, imidazole and benzimidazole group. In a more specific example, X and Y are both electron acceptor groups, in particular —SO₂—, resulting in a sulfonated polyarylene sulfone, in particular a sulfonated poly-phenylensulfone. In another specific example, X and y are —O— and —CO—, resulting in a sulfonated polyarylene ether ketone, in particular a sulfonated polyphenylene ether ketone (S-PEEK).

Generally, proton conducting acid functionalized (especially —SO₃H, —PO₃H₂) hydrocarbon ionomers and polyelectrolytes as indicated above can be converted into their corresponding alkaline ion form by using an ion exchange column or by direct exchange in solution and subsequent dialysis. Alternatively, the functionalized hydrocarbon oligomers or polymers can be synthesized directly in their alkaline ion form compounds and used in our methods.

Preparation of the starting materials (ionomers and polyelectrolytes) is well described in the literature: For sulfonic acid functionalized hydrocarbon-based ionomers there is comprehensive literature. Such polymers may be obtained by direct electrophilic sulfonation of corresponding polymers or by the polymerization of sulfonated monomers (also commonly applied). Even an inhomogeneous distribution of sulfonic functional groups may be useful to better combine mechanical and conductivity properties.

The proton conducting acid functionalized hydrocarbons may also be grafted to inorganic particles which may help to further improve the mechanical properties. Block-copolymers comprising such functionalized hydrocarbons may allow for combining very high conductivity with increased morphological stability and flexibility. The block-copolymers may comprise different blocks of proton conducting acid functionalized hydrocarbons as outlined above and also one or more blocks derived from other kinds of polymers/oligomers such as PBI (polybenzimidazole), PTFE (poly-tetra-fluoroethylene), PVDF (polyvinylidene fluoride), PSU (polysulfones), PES (polyether sulfones), PEK (polyether ketones), PPO (polyphenylene oxide), PPS (polyphenylene sulfide), PI (polyimides), PC (polycarbonates), PMMA (polymethyl methacrylates) and polyphosphazenes.

Such block-copolymers can be prepared by known methods of polymer chemistry. In a specific example, an α,ω-dihydroxy compound or a α,ω-dihalogen compound of the formula HO—Z—OH or the formula Hal-Z-Hal, respectively, wherein Z is selected from the group consisting of —(CH$_2$)$_n$—, —(CF$_2$)$_n$—, —(CF$_2$CH$_2$)$_n$—, —(CH$_2$—CH$_2$—O)$_n$—CH$_2$—CH$_2$—, —(CH(CH$_3$)—CH$_2$—O)$_n$—CH(CH$_3$)—CH$_2$—, —(CF$_2$—CF$_2$—O)$_n$—CF$_2$—CF$_2$—, polyarylene ether sulfones, polyarylene sulfides, polyarylene ether ketones, polysiloxanes (e.g., —(SiR$_2$—O)$_n$—) may be used as a comonomer for preparing such block-copolymers. Hal in the dihalogen compound represents a halogen residue, e.g., F, Cl, Br and I.

The solvated ionomers or polyelectrolytes may also be used to impregnate various porous matrices or woven fabrics.

In a specific example, the solvated ionomers or polyelectrolytes, including copolymers comprising the same, are integrated into an inert porous matrix such as an organic matrix (porous PE, PP, PVDF, PTFE, e.g., stretched PTFE or the like) or anorganic matrix (porous boronitride, silicon dioxide or the like).

The solvated ionomers or polyelectrolytes, including copolymers may comprise the same, can be combined with fiber materials such as glass fibers, ceramic fibers, textile fibers, carbon fibers, microporous polypropylene or polytetrafluoroethylene or the like.

Some general review articles are: K. D. Kreuer, *Hydrocarbon membranes*, in Handbook of Fuel Cells: Fundamentals, Technology and Applications. Volume 3: Fuel Cell Technology and Applications: Part 1, W. Vielstich, A. Lamm, and H. Gasteiger, eds., Vol. 3, Part 3, John Wiley & Sons Ltd, Chichester, UK, 2003, 420-435; Hickner M A, Ghassemi H, Kim Y S, et al., *Alternative polymer systems for proton exchange membranes (PEMs)*, Chemical Reviews 104, 4587-4611, 2004; Rikukawa M., Sanui K., Proton-conducting polymer electrolyte membranes based on hydrocarbon polymers, Progress in Polymer Science 25, 1463-1502, (2000).

Preparation of the preferred sulfonated poly phenylene sulfones is described in: M. Schuster, C. C. de Araujo, V. Atanasov, H. T. Andersen, K.-D. Kreuer, and J. Maier, *Highly Sulfonated Poly(phenylene sulfone): Preparation and Stability Issues*, Macromolecules 42(8), 3129-3137 (2009); M. Schuster, K.-D. Kreuer, H. T. Andersen, and J. Maier, *Sulfonated Poly(phenylenesulfone) Polymers as Hydrolytically and Thermooxidatively Stable Proton Conducting Ionomers*, Macromolecules 40(3), 598-607 (2007); and EP 06742514.0.

An especially advantageous method of producing a polyarylene compound as defined by Formula I comprises:
a) Production of an aryl monomer F$_1$-AS—F$_2$, where AS represents a sulfonated or phosphonated aryl system comprising one or more aromatic rings, at least one of which is substituted with a sulfonic acid group or phosphonate group, and the aryl system features functional groups F$_1$ and F$_2$, which can be identical or different from each other and are selected from the group consisting of fluorine, chlorine, bromine or iodine, or several various aryl monomers of this kind;
b) Polycondensation of the aryl monomer or aryl monomers of step a) with lithium or sodium sulfide resulting in the formation of a poly(arylene sulfide);
c) Oxidation of the poly(arylene sulfide) of step b) into a poly(arylene sulfone) or a poly(arylene sulfide sulfone).

With respect preparation of phosphonic acid functionalized ionomers and polyelectrolytes, a comprehensive summary is given by: *Benoit Lafitte and Patric Jannasch: On the Prospects for Phosphonated Polymers as Proton-Exchange Fuel Cell Membranes, Advances in Fuel Cells Vol. 1, eds. T. S. Zhao, K. D. Kreuer, T. van Nguyen, p. 119-186 (2007).*

Preparation of PVPA used as an example starting material is described in: B. Bingöl, W. H. Meyer, M. Wagner, G. Wegner: Macromolecules Rapid Communications 27, 1719 (2006).

Principally, the aprotic polar solvent may be any solvent which is able to solvate the respective hydrocarbon oligomer or polymer, i.e., ionomer or polyelectrolyte, and to allow a high uptake of the solvent by the hydrocarbon oligomer or polymer. The molar ratio of solvent/alkaline cation may be 1:1 to 10,000:1, such as 1:1 to 1,000:1 or 1:1 to 200:1. More specifically, a molar ratio of solvent/alkaline cation of 3:1 to 200:1, preferably 5:1 to 200:1, in particular 3:1 to 30:1 or 20:1, or 5:1 to 30:1 or 20:1 is used. More specifically, the aprotic polar solvent is selected from the group consisting of EC, PC, BC, γBL, γVL, NMO, DMC, DEC, EMC, EA, MB, EB, DMM, DME, DEE, THF, 2-Me-THF, 1,3-DL, 4-Me-1,3-DL, 2-Me-1,3-DL, DMSO, NMP, NEP and mixtures thereof. These solvents and their chemical structure are known and, e.g., disclosed in Doyle et al. above. Also suitable may be not only be low molecular weight solvents as above but also higher molecular weight solvents such as glyme or even polyethylene oxides (PEO).

The alkaline single ion conductors obtainable by the above methods comprise a hydrocarbon oligomer or polymer having immobilized acidic substituent groups selected from the group consisting of a sulfonic acid group, sulfamide group, a phosphonic acid group, or a carboxy group, in its alkaline ion form, wherein the hydrocarbon oligomer or polymer is solvated in an aprotic polar solvent and has a molar ratio of solvent/alkali cation of 1:1 to 10,000:1 such as 1:1 to 1,000:1 or 1:1 to 200:1, more specifically 3:1 to 200:1, preferably 5:1 to 200:1, in particular 3:1 to 30:1 or 20:1, or 5:1 to 30:1 or 20:1, and a conductivity of at least $10^{-5}$ S/cm, in particular at least $10^{-4}$ S/cm, preferably at least $10^{-3}$ S/cm, more preferred at least $5\times10^{-3}$ S/cm, at room temperature (24° C.) in the aprotic solvent. Preferably, the alkaline single ion conductors are sodium or lithium single ion conductors.

More specifically, the alkali single ion conductors comprise a compound as disclosed above, e.g., an unsubstituted or substituted polyvinyl phosphonic acid, a sulfonic acid-substituted, phosphonic acid-substituted or sulfamide-containing aliphatic or aromatic polymer, in particular a sulfonated or phosphonated polyarylene sulfone, polyarylene sulfide, polyarylene ether or polyarylene ether ketone.

The alkaline single ion conductors may comprise a polyarylene compound consisting of recurring structural elements of Formula II:

$$—[—X—Ar(WA)_n\text{-}Y—]_m—\qquad\text{(II)}$$

which may be the same or different,
wherein m is an integer of 1 to 1,000,000, more specifically 1 to 100,000, preferably 1 to 10,000, e.g., from 1 to 1,000 or 1 to 100, X and Y, which are identical or different from each other, each represent a bridging group which may be an electron-acceptor or electron-donor group or neither, W represents the anion of a sulfonic acid group or phosphonic acid group, A represents a sodium or lithium cation, n is 0.1 to 4, X and Y are selected independently of each other from the group consisting of —SO$_2$—, —SO—, —SO$_2$O—, —CO—, —COO—, —CONH—, —CONR— or —POR—, with R being an organic residue, in particular alkyl, —S—, —O—, and —SO$_2$—NH—SO$_2$—, unsubstituted or substituted alkylene, e.g., fluorinated alkylene, unsubstituted or substituted arylene, and Ar is phenyl.

More specifically, W in Formula II represents the anion of a sulfonic acid group, n is 0.1 to 4, preferably 1 to 4, X and Y are each SO$_2$ and Ar is phenyl.

We also use a polyarylene compound comprising one or more structural elements of the Formulae I or II above as an alkaline single ion conductor, in particular a sodium or lithium single ion conductor.

The alkaline single ion conductors will have a broad range of industrial applications, in particular in the fields of electrochemistry and electric energy storage technology.

Thus, we further provide an electric or electrochemical storage device comprising the alkaline single ion conductor.

The storage device may, for example, be a lithium or sodium battery, a fuel cell or a supercapacitor.

Depending on the respective intended application, the alkaline single ion conductors may be selected from the above materials as appropriate to provide specific characteristics such as a specific conductivity or the like and, in particular, may be combined with other materials as appropriate. Thus, for example, the single ion conductors may be embedded in a porous matrix or combined with fiber materials, fillers or other additives. Such materials are known as such in ion conductor technology. Some non-limiting examples are stretched PTFE and polyester fibers or the materials mentioned above.

As opposed to PFSA ionomers described in the literature, we use hydrocarbon oligomers and polymers, which, when functionalized with ion exchanging groups, can take up more solvent, either because of their higher ion exchange capacity or because of their weaker backbone interaction. The higher solvent uptake is thought to lead to a higher degree of dissociation and a better connectivity within the solvated part of the material. In this way, the conductivity is significantly higher ($>10^{-3}$ S/cm at room temperature), and this conductivity is a true single ion conductivity, because the anions (e.g., $-SO_3H$, $-PO_3H_2$) are immobilized on the polymer backbone. Another consequence of the generally lower backbone interaction (hydrocarbon backbones are generally less hydrophobic than the PTFE backbone of PFSA membranes) is a more homogeneous distribution of the solvent. This leads to a generally lower hydrodynamic solvent transport (e.g., electroosmotic solvent drag) and formation of highly viscous instead of membrane like materials. High single ion conductivity and low electroosmotic drag actually prevent the system from any significant current polarization effect, and its viscous character allows for the immediate substitution of conventional liquid electrolytes in existing electrochemical cells such as Li-ion batteries in which the electrolyte is a constituent of both the separator and the electrode structures.

Figure 3:
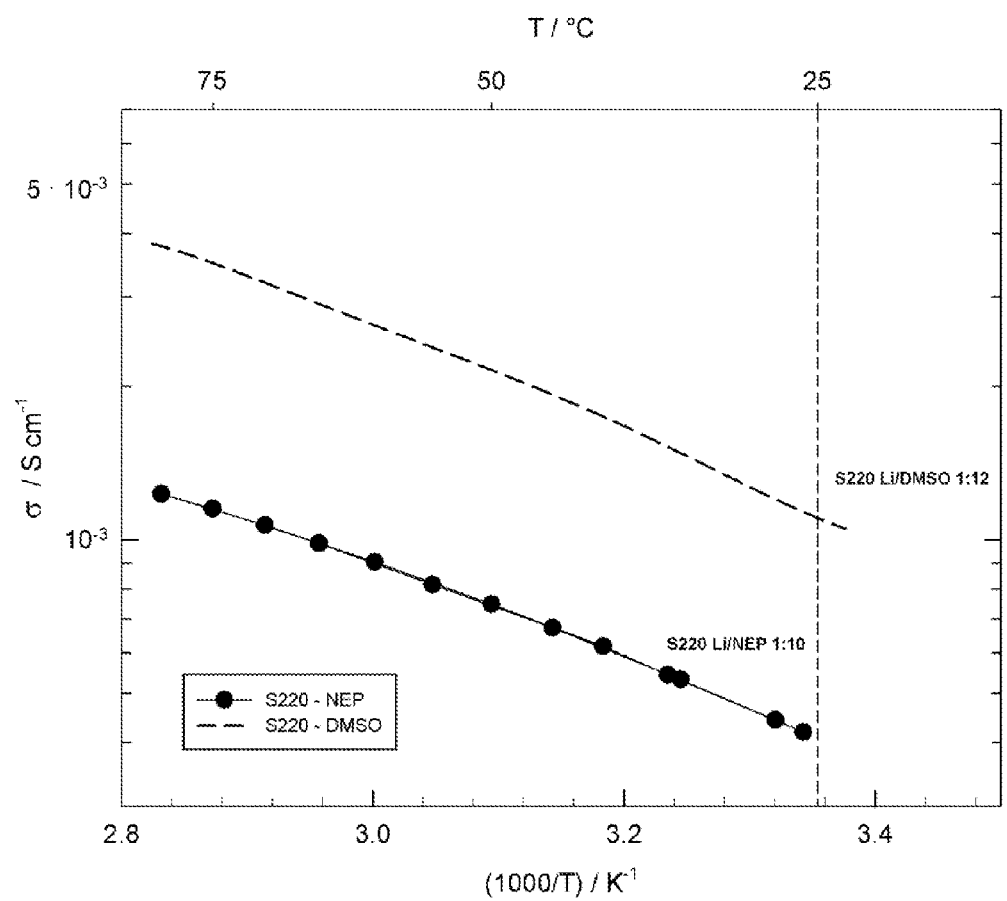
FIG. 3 shows $Li^+$-conductivity of S-220 in the Li-form solvated with NEP. Corresponding conductivity for DMSO as a solvent are shown for comparison.

Sulfonated poly(phenylene-sulfones) with a high ion exchange capacity provide especially high conductivities (e.g., S-220 and S-360) as shown in FIGS. 1 and 3.

However, it actually turned out that all tested hydrocarbon ionomers with sulfonic functional groups show interesting ionic conductivities. These comprise sulfonated poly-phenylene-ether-ketones (S-PEEK) and even sulfonated poly(phenylene-sulfones) with relatively low ion exchange capacity, i.e., high equivalent weight (S-640) (see FIG. 2).

This demonstrates that the sulfonic acid anion immobilized on any hydrocarbon polymer can serve as a conjugated base for the alkali cation, in particular Li$^+$ ion. In particular, it is not necessary to use superacidic anions with highly delocalized electron density such as the sulfimide anion, $(SO_2-N-SO_2)^-$, in obtaining high Li$^+$ conductivity. The latter was recently claimed by M. Armand et al. who reported a 30 times higher ionic conductivity for a bis(trifluoromethane-sulfonyl) imide functionalized polystyrene blended with poly(ethylene oxide) (PEO) as compared to the conductivity of a corresponding material with sulfonated polystyrene ($3 \times 10^{-5}$ compared to $10^{-6}$ S cm$^{-1}$) (Michel Armand, Jean-Pierre Bonnet, Rachid Méziane; 12th International Symposium on Polymer Electrolytes, Padova Aug. 29-Sep. 3, 2010).

There is also a significant degree of freedom in the choice of the aprotic solvent. It may comprise any of the solvents disclosed above or by Kang Xu in Chemical Reviews 2004, 104, 4303-4417. In one example, some conductivities of S-220 in the Li-form solvated with NEP instead of DMSO have been assessed and are shown in FIG. 3. For a given mole fraction of solvent, the conductivities are actually slightly lower which is probably reflecting a lower degree of dissociation as a consequence of the lower dielectric constant of NEP compared to DMSO. Nevertheless, the observed conductivities are still very high.

Figure 4:
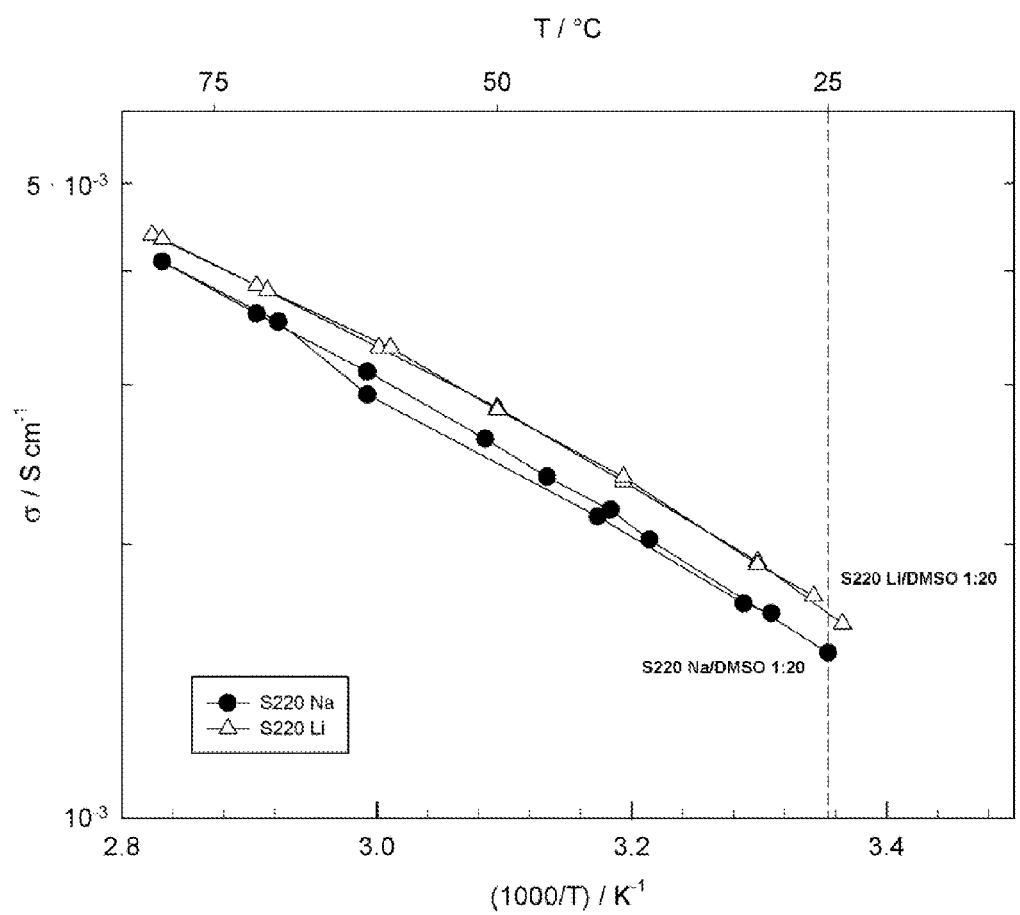
FIG. 4 shows $Na^+$ conductivity of S-220 in its Na-form solvated with various amounts of DMSO. The $Li^+$ conductivity of S-220 in its Li-form is given for comparison.

The new concept has been also proven to work successfully for other alkaline ions. Just as an example, the Na$^+$ conductivity of S-220 in its Na-form solvated with DMSO is shown in FIG. 4.

Figure 5:
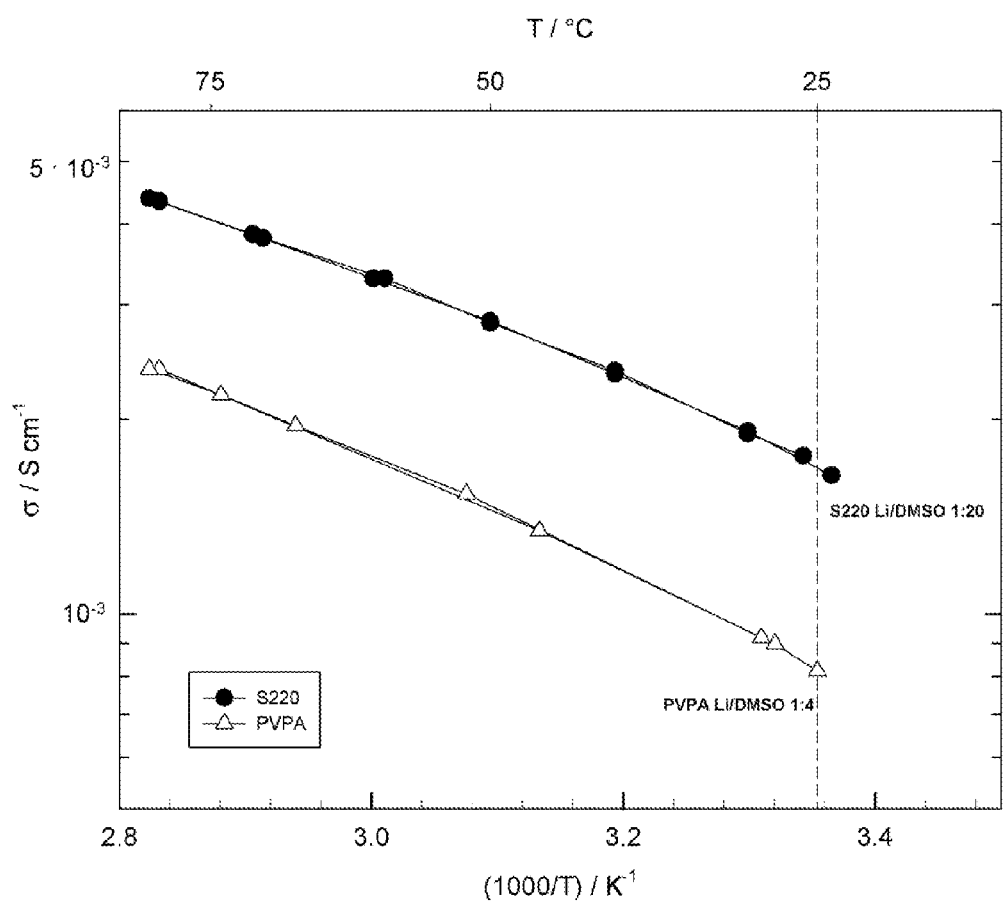
FIG. 5 shows Li⁺-conductivity of PVPA in its Li-form solvated with DMSO. The conductivity of S-220 is given form comparison.

Very unexpectedly, interesting alkaline ion conductivities are also obtained with ionomers and polyelectrolytes functionalized with groups significantly less acid than sulfonic acid functional groups. As an example, polyvinyl-phosphonic acid (PVPA) in its Li-form was solvated with DMSO, and a high Li$^+$ conductivity of $8 \times 10^{-4}$ S cm$^{-1}$ at room temperature is obtained (FIG. 5).

The following examples are given for illustrative purposes.

EXAMPLE 1

Two sulfonated poly(phenylene-sulfones) with different molecular weights and degree of sulfonation, S-220 and S-360, have been prepared as disclosed in EP 06 742 514.0, converted into the Li$^-$ form and solvated with different proportions of DMSO as the aprotic polar solvent. Ion exchange from the proton into the Li$^+$ form was carried out in an excess of 1M LiCl solution before purification by dialysis. The clean product was then dried in vacuum at T=160° C. for 20 h before solvation with the corresponding aprotic solvent. The latter reaction required some heating (T=70° C.) and ultrasonic agitation.

Subsequently, the Li-conductivity of the resulting products was assessed by ac impedance spectroscopy and FIG. 1 demonstrates that for both compounds room temperature Li$^+$ conductivities of $2 \times 10^{-3}$ S/cm have been obtained for high solvent concentrations (e.g., DMSO/—SO$_3$Li=20 for S-220, DMSO/—SO$_3$Li=30 for S-360, corresponding to highly viscous liquids.

EXAMPLE 2

Figure 2:
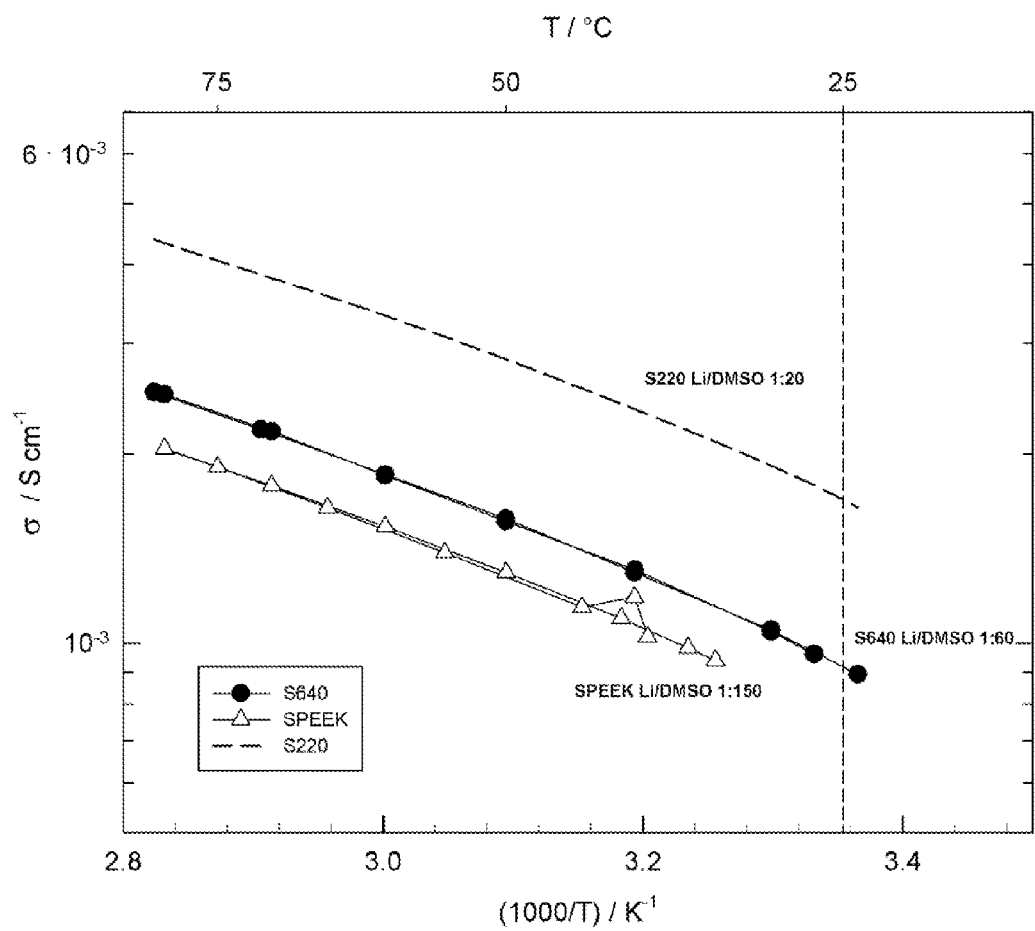
FIG. 2 shows $Li^+$-conductivity of a sulfonated poly-phenylene-ether-ketone (S-PEEK) with an equivalent weight of 900 g/meq. Solvated with 150 mole DMSO/mol $Li^+$ (black) and $Li^+$ conductivity of S-640 (60 mol DMSO/mol $Li^+$, blue). The conductivity of S-220 (red) is shown for comparison.

A sulfonated poly(phenylene-ether-ketone) (S-PEEK) (A-O-A-O-A-CO—, A partially sulfonated) prepared as described or purchased from Fumatech and a sulfonated poly(phenylene-sulfone) with low ion exchange capacity, i.e., high equivalent molecular weight, S-640) were transferred into their Li$^+$ forms (as described above) and solvated with DMSO. FIG. 2 shows the resulting conductivities in comparison with S-220 and demonstrates that with appropriate solvent ratios high conductivities of $>10^{-3}$ S/cm are obtainable with these materials as well.

EXAMPLE 3

The sulfonated poly(phenylene-sulfone) S-220 of Example 1 was also solvated with NEP in a Li/solvent ratio of 1:10 (as described above) and the resulting conductivity compared to the conductivity with DMSO as a solvent under the same conditions (measurements as described in Example 1).

FIG. 3 shows that for a given mole fraction of solvent, the conductivities are actually slightly lower than in DMSO which is probably reflecting a lower degree of dissociation as a consequence of the lower dielectric constant of NEP compared to DMSO. Nevertheless, the observed conductivities are still very high.

EXAMPLE 4

The sulfonated poly(phenylene-sulfone) S-220 was also prepared in its $Na^+$ form and solvated with various amounts of DMSO as described in Example 1. FIG. 4 demonstrates that in this case also high conductivities in the range of $>10^{-3}$ S/cm were obtained.

EXAMPLE 5

A polyvinylphosphonic acid (PVPA) prepared by free radical polymerization (B. Bingöl, W. H. Meyer, M. Wagner, G. Wegner Macromolecules Rapid Commun. 27, 1719 (2006)) was transferred into its $Li^+$ form using a ion exchange and solvated with DMSO. FIG. 5 shows the resulting conductivity in comparison with the corresponding conductivity of S-220.

Summarizing, ionomers and polyelectrolytes with high solvent content (as a consequence of high ion exchange capacity and/or weak backbone interaction) are shown to exhibit very high ionic conductivity in their $Li^+$ and $Na^+$ forms when solvated with aprotic polar solvents such as DMSO, EC or PC. The electrolytes show low hydrodynamic solvent transport and they are single ion conductors, i.e., the transference number of the cations is close to unity.

The invention claimed is:

1. A method of producing an alkaline single ion conductor with high conductivity comprising:
  a) providing a hydrocarbon oligomer or polymer having acidic substituent groups selected from the group consisting of a sulfonic acid group and a phosphonic acid group immobilized on a backbone of the oligomer or polymer, wherein the sulfonic acid group and phosphonic group are either neutral or, in alkaline ion form, are negatively charged, and wherein in the alkaline ion form of the oligomer or polymer at least a part of the acidic protons of said substituent groups have been exchanged against alkali cations, and
  b) solvating the hydrocarbon oligomer or polymer of step a) in an aprotic polar solvent for a sufficient time to effect an solvent uptake of at least 5% by weight and to obtain a solvated product, wherein the molar ratio of solvent/alkaline cation is 1:1 to 10,000:1, and which solvated product has a conductivity of at least $10^{-5}$ S/cm at room temperature (24° C.).

2. The method according to claim 1, wherein the hydrocarbon oligomer or polymer is a polyvinyiphosphonic acid or a polyarylene compound comprising one or more structural elements of Formula I:

—[—X—Ar(WA)$_n$-Y—]$_m$— (I)

wherein m is an integer of 1 to 1,000,000, X and Y, which are identical or different from each other, each represent a bridging group which may be an electron-acceptor or electron-donor group or neither, and Ar represents an aromatic or heteroaromatic ring system with 5-18 ring atoms and with W representing an anion of an acidic substituent group selected from a sulfonic acid group and a phosphonic acid group, A representing an alkali cation, and n being 0.1 to 4; wherein the aromatic or heteroaromatic ring system, in addition to the acidic group W and the substituents X and Y, optionally comprise additional substituents; and wherein X, Y, Ar, W, n and m can be identical or different in different structural elements, independently of each other.

3. The method according to claim 1, wherein the alkali cation is selected from the group consisting of a $Na^+$ cation and a $Li^+$ cation.

4. The method according to claim 2, wherein X and Y in Formula I are selected independently of each other from the group consisting of —$SO_2$—, —SO—, —$SO_2O$—, —CO—, —COO—, alkylene, fluorinated alkylene, arylene, —CONH—, —CONR— or —POR—, with R being an organic residue, —S—, —O—, and —$SO_2$—NH—$SO_2$—.

5. The method according to claim 2, wherein Ar is selected from the group consisting of phenylene, naphthylene, anthracene, phenanthrene, biphenylene, furan, thiophene, pyrrole, thiazole, triazole, pyridine, imidazole and benzimidazole.

6. The method according to claim 2, wherein the polyarylene compound consists of recurring elements of Formula I.

7. The method according to claim 1, wherein the aprotic polar solvent is selected from the group consisting of EC, PC, BC, yBL, yVL, NMO, DMC, DEC, EMC, EA, MB, EB, DMM, DME, DEE, THF, 2-Me-THF, 1,3-DL, 4-Me-1,3-DL, 2-Me-1,3-DL, DMSO, NMP, NEP and mixtures thereof.

8. An alkaline single ion conductor produced by the method of claim 1 and comprising a hydrocarbon oligomer or polymer having immobilized acidic substituent groups selected from the group consisting of a sulfonic acid group and a phosphonic acid group in its alkaline ion form, wherein the hydrocarbon oligomer or polymer is solvated in an aprotic polar solvent and has a molar ratio of solvent/alkali cation of 1:1 to 10,000:1, and a conductivity of at least $10^{-5}$ S/cm at room temperature (24° C.) in said aprotic solvent.

9. The alkaline single ion conductor according to claim 8 which is a sodium or lithium single ion conductor.

10. The alkaline single ion conductor according to claim 9, comprising a polyarylene compound consisting of recurring structural elements of Formula II:

—[—X—Ar(WA)$_n$-Y—]$_m$— (II)

which may be the same or different,
  wherein m is an integer of 1 to 1,000,000, W represents the anion of a sulfonic acid group or phosphonic acid group, A represents a sodium or lithium cation, n is 0.1 to 4, X and Y are selected independently of each other from the group consisting of —$SO_2$—, —SO—, —$SO_2O$—, —CO—, —COO—, —CONH—, —CONR— or —POR—, with R being an organic residue, in particular alkyl, —S—, —O—, —$SO_2$—NH—$SO_2$—, alkylene, fluorinated alkylene), arylene, and Ar is phenyl.

11. The alkali single ion conductor according to claim 10, wherein W represents the anion of a sulfonic acid group, n is 0.1 to 4, X and Y are each $SO_2$ and Ar is phenyl.

12. The alkaline single ion conductor according to claim 8, which is embedded in a porous matrix or is combined with fiber materials, fillers or other additives.

13. An electric or electrochemical storage device comprising the alkaline single ion conductor according to claim 8.

14. The storage device according to claim 13, which is a lithium or sodium battery, a fuel cell or a supercapacitor.

* * * * *